(12) United States Patent  (10) Patent No.: US 9,122,872 B1
Rusakov et al.  (45) Date of Patent: Sep. 1, 2015

(54) SYSTEM AND METHOD FOR TREATMENT OF MALWARE USING ANTIVIRUS DRIVER

(71) Applicant: Kaspersky Lab ZAO, Moscow (RU)

(72) Inventors: Vyacheslav E. Rusakov, Moscow (RU); Oleg V. Zaitsev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/479,894

(22) Filed: Sep. 8, 2014

(30) Foreign Application Priority Data

Jun. 20, 2014  (RU) .................................. 2014125113

(51) Int. Cl.
  *G06F 21/00*  (2013.01)
  *G06F 21/56*  (2013.01)

(52) U.S. Cl.
  CPC ............ *G06F 21/565* (2013.01); *G06F 21/568* (2013.01)

(58) Field of Classification Search
  None
  See application file for complete search history.

(56) References Cited

U.S. PATENT DOCUMENTS

| 5,960,170 | A | 9/1999 | Chen et al. |
| 7,062,553 | B2 * | 6/2006 | Liang ........................... 709/224 |
| 8,010,799 | B2 | 8/2011 | Zimmer et al. |
| 8,099,785 | B1 | 1/2012 | Pavlyushchik |
| 8,201,253 | B1 * | 6/2012 | Yan et al. ........................ 726/24 |
| 8,479,292 | B1 | 7/2013 | Linhardt |
| 8,489,925 | B1 * | 7/2013 | Antukh et al. .................. 714/26 |
| 8,776,166 | B1 * | 7/2014 | Erickson et al. .................. 726/1 |
| 2006/0195745 | A1 | 8/2006 | Keromytis et al. |
| 2008/0005797 | A1 | 1/2008 | Field et al. |
| 2009/0217378 | A1 | 8/2009 | Johnson et al. |
| 2009/0241170 | A1 * | 9/2009 | Kumar et al. ..................... 726/3 |
| 2010/0325164 | A1 * | 12/2010 | Norton et al. ................. 707/797 |
| 2011/0083180 | A1 * | 4/2011 | Mashevsky et al. ............ 726/23 |

* cited by examiner

*Primary Examiner* — Lisa Lewis
*Assistant Examiner* — Maung Lwin
(74) *Attorney, Agent, or Firm* — Arent Fox LLP; Michael Fainberg

(57) ABSTRACT

Disclosed are systems, methods and computer program products for treatment of malware using an antivirus driver. In one aspect, an example method includes performing, by an antivirus software, an antivirus scan of the computer; detecting, by the antivirus software, a malicious object on the computer; formulating at least one task for treatment of the detected malicious object; configuring and activating on the computer an antivirus driver of the antivirus software to execute the at least one formulated task for treatment of the detected malicious object; and rebooting the computer by the antivirus software, whereby upon rebooting of the computer the antivirus driver is loaded by the operating system of the computer to execute the at least one task for treatment of the detected malicious object.

21 Claims, 3 Drawing Sheets

SYSTEM AND METHOD FOR TREATMENT OF MALWARE USING ANTIVIRUS DRIVER

CROSS-REFERENCE TO RELATED APPLICATIONS

This application claims benefit of priority under 35 U.S.C. 119(a)-(d) to a Russian Application No. 2014125113 filed on Jun. 20, 2014, which is incorporated by reference herein.

FIELD OF TECHNOLOGY

The present disclosure relates generally to the field of computer security, and, more specifically, to systems and methods for treatment of malware using an antivirus driver.

BACKGROUND

Presently, there are many different type of malicious computer programs, also known as malware, which impose a serious threat to computers and computer networks. Malware can infect a computer and can spread by various mechanisms, such as e-mail, Internet chat, and instant messaging, thereby quickly infecting other computers. Different types of malware can be distinguished by their behavior from relatively innocuous ones (such as those which present annoying messages to the user) to harmful and catastrophic types, including complete destruction of data on the hard drive, which results in loss of data and the possible need to completely restore the operating system and the given applications from a backup copy.

One should note the ambition of the creators of malicious programs to write code which is very hard to treat (an example of malware treatment might be removal or quarantine, and also the restoration of uninfected copies of objects, such as files). In the past, the creators of malicious programs were little concerned about this aspect, since it was more important to many nonprofessional creators of malicious programs to spread the malicious programs with the greatest speed and infect as many computers as possible. With the commercialization of the writing of malicious programs, the goals have also changed—the professional creators of malicious programs often seek to create code segments of complicated structure to guarantee that the malicious programs written by them will not be so easy to treat and remove.

Thus, there is a category of malicious programs today that are specially designed to prevent treatment. For example, malicious programs that prevent treatment usually create many copies of themselves on the same computer, which are executed at the same time, using the threads of different processes. Thus, in this scenario, the malicious program can have one copy of its code which has infected Internet Explorer® (it is executed in the thread of this process), and another copy of its code which infected the Outlook® mail client (i.e., it is executed in the thread of the process of the mail client). When an antivirus software identifies one of the copies of the malicious program (e.g., the copy of the malicious program that infected Internet Explorer®), the antivirus software removes this copy of the malicious program and removes the copy of the executable file which contains the code of the malicious program.

But this is insufficient for malicious programs resistant to treatment—the other copy of the malicious program (in this case, the copy which infected the mail client) determines that the first copy has been removed, and immediately copies itself into that part of working memory where Internet Explorer® resides, again infecting the browser and again launching the thread of the first copy of the malicious program. When the antivirus software finds the second copy (the one that infected the mail client), the whole process occurs precisely in reverse.

One may also note the development of so-called rootkit technologies, by which malicious programs have the ability to hide, limit access and restore the files or OS registry branches needed by them. In this case, if the antivirus is not able to determine the malicious driver which is hiding the malicious files, detection and treatment becomes almost impossible.

Technologies exist at present for fighting such malicious programs. However, the existing technologies do not make possible a stepwise execution of a series of actions guaranteeing the removal of the malicious code from the system. One of the problems in the treatment of malicious programs is that there is no guarantee that the rootkit driver will not be loaded first during boot procedure and hide the malicious files or OS register branches from the antivirus driver that will be performing the search and treatment. Another problem is, for example, the need to load the appropriate drivers during boot procedure (for the file system, for example) in order to be able to remove the malicious objects (e.g. files).

Therefore, there is a need for an improved mechanism for treatment of malware.

SUMMARY

Disclosed are systems, methods and computer program products for treatment of malware using an antivirus driver.

In one example aspect, a method for treatment of malicious objects on a computer comprises performing, by an antivirus software, an antivirus scan of the computer; detecting, by the antivirus software, a malicious object on the computer; formulating at least one task for treatment of the detected malicious object; configuring and activating on the computer an antivirus driver of the antivirus software to execute the at least one formulated task for treatment of the detected malicious object; and rebooting the computer by the antivirus software, whereby upon rebooting of the computer the antivirus driver is loaded by the operating system of the computer to execute the at least one task for treatment of the detected malicious object.

In another example aspect, a system for treatment of malicious objects on a computer comprises a computer processor configured to execute an antivirus software, wherein the antivirus software is configured to perform an antivirus scan of the computer; detect a malicious object on the computer; formulate at least one task for treatment of the detected malicious object; configure and activate an antivirus driver to execute the at least one formulated task for treatment of the detected malicious object; and reboot the computer, whereby upon rebooting of the computer the antivirus driver is loaded by the operating system of the computer to execute the at least one task for treatment of the detected malicious object.

In yet another example aspect, a computer program product stored on a non-transitory computer-readable storage medium comprises computer-executable instructions for treatment of malicious objects on a computer, including instructions for performing, by an antivirus software, an antivirus scan of the computer; detecting, by the antivirus software, a malicious object on the computer; formulating at least one task for treatment of the detected malicious object; configuring and activating on the computer an antivirus driver of the antivirus software to execute the at least one formulated task for treatment of the detected malicious object; and rebooting the computer by the antivirus software, whereby upon rebooting of the computer the antivirus driver is loaded by the operating system of the computer to execute the at least one task for treatment of the detected malicious object.

In some aspects, the antivirus driver includes one of a file system driver and a plug-in driver of the antivirus software. In some aspects, formulating at least one task for treatment of the detected malicious object further includes compiling the task into a machine code. In some aspects, formulating at least one task for treatment of the detected malicious object further includes writing the at least one task for treatment of the detected malicious object into a specific registry branch before rebooting the computer. In some aspects, formulating at least one task for treatment of the detected malicious object further includes saving the at least one task for treatment of the detected malicious object into a file before rebooting the computer. Some aspects further comprise, before rebooting the computer, checking integrity of the task for treatment of the detected malicious file. Some aspects further comprise using system notifications to start the execution of the task for treatment of detected malicious object. In some aspects, the antivirus driver is loaded by the operating system of the computer from another computer over a network.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for treatment of malware using an antivirus driver. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
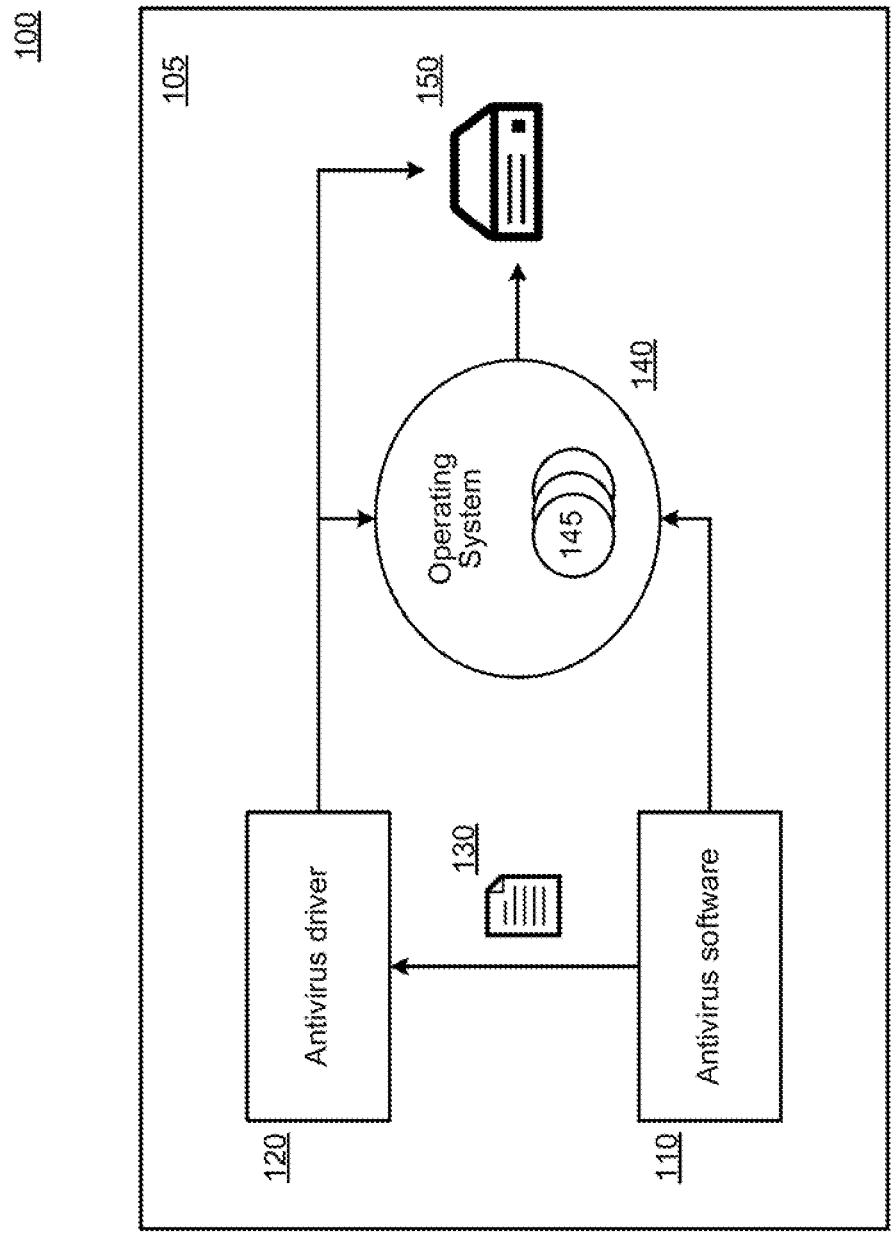
FIG. 1 illustrates a block diagram of an example system for treatment of malware using an antivirus driver according to one aspect.

FIG. 1 shows of an example system for treatment of malware using an antivirus driver according to one aspect. The system 100 includes an antivirus software 110 (such as Kaspersky® Antivirus) configured to check various objects 145 in the operating system 140 of a computer 105, such as processes, files, registry, etc., as well as objects 150 whose accessing requires the presence of a separate driver (such as the file system driver). If during antivirus check, the antivirus software 110 detects malicious objects, the antivirus software 110 formulates a task 130, which includes specific actions for treatment of the detected malicious object, and saves the task 130 on the computer 105. In one aspect, the task 130 may be saved in one of the register branches which will be one of the first to be loaded into memory (this applies to the family of Microsoft® Windows® operating systems). In another aspect, the task 130 may be saved as a file in a separate location on the hard disk drive of computer 105, which can only be accessed by the antivirus software 110 and an antivirus driver 120 provided by the antivirus software 110. The antivirus software 110 then configures and activates an antivirus driver 120 to execute the formulated task and reboots the computer 105. Upon booting of the computer 105, the antivirus driver 120 is loaded by the operating system 140. The antivirus driver 120 can either communicate with the operating system 140 (via system API calls) to execute the task 130 for treatment of the malicious objects 150, or access directly objects 150 using a custom protocol (such as a custom version of the file system driver).

In one example aspect, the antivirus driver 120 may be a kernel-mode boot driver performing a specified sequence of actions or tasks at system startup. After this sequence of actions or tasks is performed, the driver may self-destruct. The driver may be a part of a database used by the antivirus software; this database may be updated manually or automatically in the course of updating the antivirus software by the antivirus company.

In one example aspect, the antivirus driver 120 may be configured to delete, disable, and/or quarantine files, registry keys, drivers, and/or services at system startup. In this case, the antivirus driver 120 may include a sequence of commands and functions programmed in a scripting language, such as AVZ scripting language, may indicate which one of these actions need to be performed, in which sequence, and on which files, keys, drivers, or services. The antivirus driver 120 can also log its actions and the results and result codes for these actions, including success/failure and error codes. The logs may be generated and stored as text files. The scripting language indicates which results and which result codes to log and when.

An example of the antivirus driver 120 written in AVZ scripting language is provided below. This antivirus driver is configured to delete a driver named "PE386" and two files named "trojan1.exe" and "trojan2.exe", to enable the system, install and configure the driver (with the "BC_Activate" command), and to reboot Windows. The "BC_LogFile" function call causes the antivirus driver to log the actions and their results into a text file named "boot_clr.log".

Begin
BC_DeleteSvc('PE386');
BC_DeleteFile('%Windir%\trojan1.exe');
BC_DeleteFile('%Windir%\trojan2.exe');
BC_LogFile(GetAVZDrectory+'boot_clr.log');
BC_Activate;
RebootWindows(true);
end In yet another aspect, the antivirus software 110 may load into antivirus driver 120 other drivers necessary for working with the objects 150 (e.g., these drivers may be executed in the form of plug-ins of the antivirus driver 120). For example, when it is necessary to treat files (via removal or quarantine) which are stored on a disk having file system ReiserFS, the antivirus software 110 may additionally load along with the antivirus driver 120 a driver for this particular file system. As another example, the antivirus software 110 may also add to the antivirus driver 120 drivers of external devices necessary for accessing to their internal data (e.g., to firmware).

Figure 2:
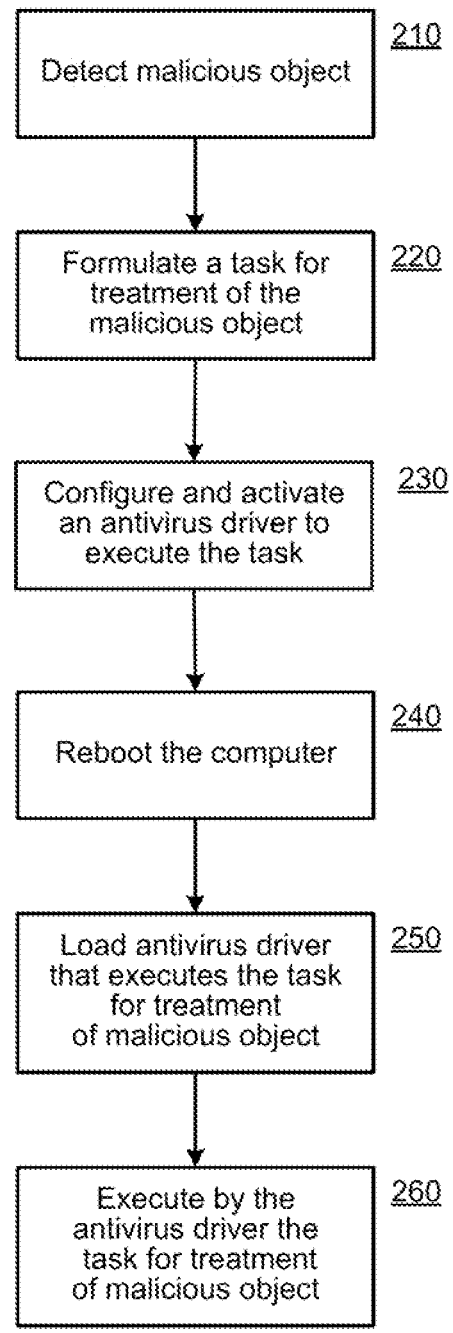
FIG. 2 illustrates a flow diagram of an example method for treatment of malware using an antivirus driver according to one aspect.

FIG. 2 illustrates an example method for treatment of malware using an antivirus driver according to one aspect. In step 210, the antivirus software 110 performs an antivirus check of computer 105 and detects one or more malicious objects. The antivirus check may include any known detection methods, such as signature matching, heuristic analysis, emulation and other methods. The malicious objects may include, but not limited to, files, registry keys, processes, network connections, drivers, services, kernel objects and other components of the operating system which have been recognized by the antivirus software 110 as being harmful.

In step 220, the antivirus software 110 formulates a task 130 for the treatment of detected malicious object(s). In one example aspect, the task 130 may be compiled in the form of machine code, which can be executed immediately after the booting of the computer 105, i.e., at the moment when the operating system 140 is not yet fully loaded and every conceivable framework is absent (that is, they are not yet loaded), such as the .NET Framework or the Java Runtime Environment, which makes it possible to execute code written in high-level languages, such as C#. In another aspect, the loading of special interpreters may also take place, which make it possible to execute pseudo code, such as by using script language AVZ.

In one example aspect, the task 130 for treatment of the detected malicious object(s) may consist of a sequence of one or more actions (e.g., jobs), including, but not limited to, removal of a file, copying of a file (from a backup copy, for example), creation of a registry key, removal of a registry key, removal of a registry value, creation of a registry value, placing a file in quarantine, placing a service in quarantine, removal of a symbolic link of a registry key, removal of a file by the hash sum, and other actions.

In one example aspect, the execution of actions in the task 130 for treatment of malicious object(s) may be activated by certain system notifications; a hook or hooks intercepting system calls and analyzing their context can be used for this purpose. An example of such notifications is changes in certain registry branches (such as HKEY_CURRENT_USER).

It should also be noted that the task 130 of treatment of the detected malicious objects cannot be fully executed without ability to work with malicious objects of various types. For example, for the modification of certain registry keys, the corresponding hive first needs to be loaded. For working with the file system (e.g., in order to remove a file), a corresponding driver needs to be loaded (e.g., a driver for working with NTFS file system).

In one example aspect, the task 130 of treatment the detected malicious objects may be saved in one of the registry branches of the operating system 140, which will be loaded into memory as one of the first after the start of the loading of the operating system 140. In another example aspect, the task 130 of treatment of detected malicious objects may be read from a file, from a portable data medium (such as a flash drive), or from the network.

In addition, in step 220, a check can be made for the integrity of the task of treatment the detected malicious objects. For example, after the task 130 of treatment the detected malicious objects has been formulated and the computer 105 needs to be rebooted for its execution, the unknown malicious process might remove this task both from memory and from the registry or modify the task, e.g., add destructive operations to it. In this case, another driver may be used to protect the task 130 of treatment the detected malicious objects, which will check the integrity of the task and, in case the task is modified, restore it.

In step 230, the antivirus software 110 configures and activates an antivirus driver 120. For example, configuring the antivirus driver 120 includes providing to the antivirus driver 120 information about the location where the task 130 of treatment the detected malicious objects is saved. As explained above, the location can include a registry branch, a file on the computer 105 or on an external media drive or network drive. In another example, configuring the antivirus driver 120 may further include adding to the driver 120 any additional drivers (e.g., plug-in drivers) that are necessary for working with the detected malicious object(s). In another example, activating the antivirus driver 120 includes saving the antivirus driver 120 on the computer 105, so that the antivirus driver 120 can be loaded by the operating system during the subsequent rebooting of the computer 105. The antivirus driver may be stored in a variety of locations. In one example aspect, the antivirus driver is stored in one of the registry branches which would be loaded very early at the system boot time. In another example aspect, the antivirus driver is stored in and read from some specific sectors on a hard drive. In yet another example aspect, particularly useful for thin clients, after loading the Unified Extensible Firmware interface (and possibly the necessary network drivers as well) the antivirus driver is loaded from a remote source, such as a network server computer, which may be hosted by the antivirus company.

In step 240, the antivirus software 110 may reboot computer 105 and, in step 250, the antivirus driver 120 is loaded during boot up of the computer 105 to execute the task 130 for treatment of detected malicious objects. Notably, the loading of the driver 120 should be done as soon as possible, since one cannot rule out a situation where a malicious driver is loaded prior to the antivirus driver 120, realizing a rootkit functionality to hide the malicious objects, In one example aspect, the antivirus driver 120 can load itself, for example, during the process of loading the operating system 140. In another aspect, a special driver with limited functionality may be loaded, which is needed only to perform the functions necessary for the task of treatment of the detected malicious objects. For example, the special driver of a file system may contain only a call for the function of removal of a file, which might be sufficient to perform the treatment of the detected malicious object.

In step 260, the task 130 for treatment of detected malicious objects is executed by the antivirus driver 120. As a rule, the execution of the task involves a consecutive execution of actions (jobs), however when a scenario interpreter is present (such as AVZ) it is possible to employ cycles, conditional and unconditional jumps, checking of conditions, and so forth. An important feature is the possibility of executing a task 130 at the instant of loading the corresponding drivers or services. For example, after loading the file system driver (such as NTFS) it becomes possible to carry out all file operations. Thus, if certain actions (jobs) need additional functionality to be performed, their execution will be forced after all prerequisites are met (e.g. requesting loading of the needed driver).

Shown below is an example scenario (in AVZ language) performed by the antivirus software 110 for scanning of a Windows folder (with recursive bypass) for the presence of malicious files, formulating a task for treatment of detected malicious files, configuring an antivirus driver to execute the formulated task, and rebooting the computer system:

```
    var
    MalwareFound: boolean;
    //Procedure for scanning a file for malware using signature matching
    Procedure ScanFile(AFileName: string);
    var
    FMD5: string;
    begin
    //Calculating MD5 hash sum for the file
    FMD5:=CalkFileMD5(AFileName);
    //Comparing MD5 hash sum with known malware signatures
    if
    ((FMD5='116C0F42CA4BB8B9E9BEA876762DE8B8')
    or
        (FMD5='0E35104727582288A4B0767FD5A41384'))
            then begin
        //Configure the antivirus driver to perform the task of treatment of malware
        BC_DeleteFile(AFileName);
        MalwareFound:=true;
        end;
    end;
    //Procedure for scanning a file directory
    Procedure ScanDir(ADirName: string; AScanSubDir: boolean);
    var
    FS: TFileSearch;
    begin
    ADirName:=NormalDir(ADirName);
    FS:=TFileSearch.Create(nil);
    FS.FindFirst(ADirName+'*.*');
    while FS.Found do begin
    if FS.IsDir then begin
    if AScanSubDir and (FS.FileName < >'.') and (FS.FileName < >'..') then
        ScanDir(ADirName+FS.FileName, AScanSubDir)
    end else
    ScanFile(ADirName+FS.FileName);
    FS.FindNext;
    end;
    FS.Free;
    end;
    begin
    MalwareFound:=false;
    ScanDir('c:\windows\', true);
    if MalwareFound then begin
    //Activate the antivirus driver
    BC_Activate;
    //Reboot the computer
    RebootWindows(true);
    end;
    end.
```

At the time of activation of this scenario, it is not known precisely which file (or files) need to be removed from the computer 105, yet criteria are known for how to find it (e.g., file extension, approximate file size, a certain static signature or a check sum), in this example, the decision making logic is found in the ScanFile procedure, the command BC_Activate activates the antivirus driver, and RebootWindows performs rebooting of computer 105. These types of scenarios may be created by the antivirus software 110 in steps 210 and 220. These scenarios may have complex logic that includes the analysis of registry keys, auto start settings of applications, classes, services and drivers registered in the system, files on disk, and so on.

Figure 3:
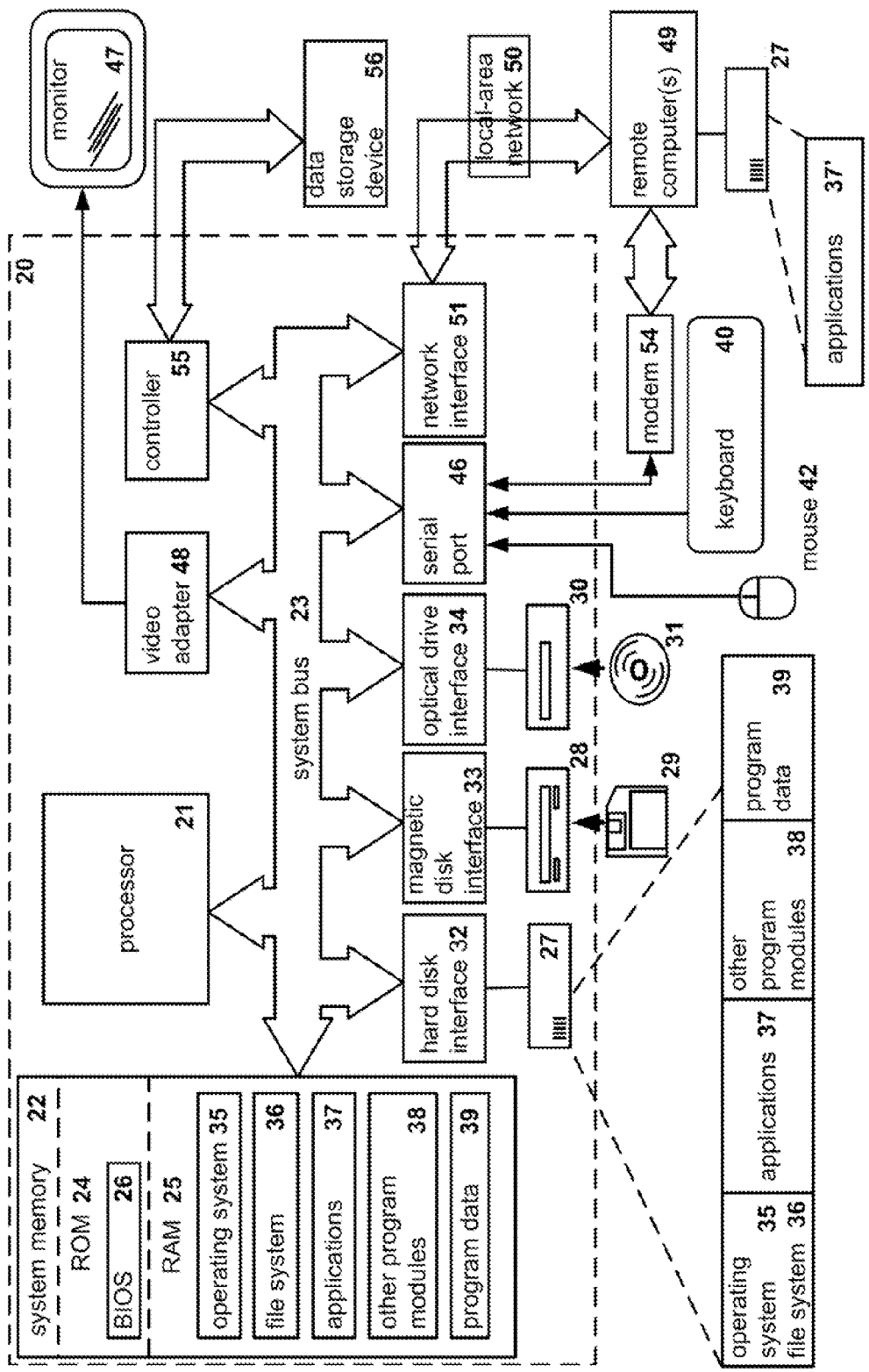
FIG. 3 illustrates an example of a general-purpose computer system, such as a personal computer or server, which may be used to implement the disclosed systems and methods for treatment of malware using an antivirus driver according to one aspect.

FIG. 3 shows an example of a general-purpose computer system (which may be a personal computer or a server) 20, which may be used to implement system and methods for treatment of malware using an antivirus driver. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the computer 20, such as those at the time of loading the operating system with the use of the ROM 24.

The computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer 20.

The computer 20 may include one or more hard disk drives 27, removable magnetic disks 29 and removable optical disks 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computer 20 is able to work in a network environment, using a network connection to one or more remote computers 49. The remote computer (or computers) 49 may also be personal computers or servers having the majority or all of the aforementioned elements in describing the nature of the computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the computer 20 is connected to the local-area network 50 across a network adapter or network interface 51. When networks are used, the computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for treatment of malicious objects on a computer, the method comprising:
  performing, by an antivirus software executable by a hardware processor, an antivirus scan of a first plurality of objects associated with the operating system of the computer and a second plurality of objects requiring separate corresponding drivers to access;
  detecting, by the antivirus software, a malicious object on the computer;
  formulating at least one task for treatment of the detected malicious object;
  configuring and activating on the computer an antivirus driver of the antivirus software to execute the at least one formulated task for treatment of the detected malicious object;
  before rebooting the computer, checking an integrity of the at least one task by using another driver;
  rebooting the computer by the antivirus software;
  upon detecting a modification of the at least one task by the detected malicious object, restoring the at least one task by using the another driver; and
  loading the antivirus driver to execute the at least one task for treatment of the detected malicious object.

2. The method of claim 1, wherein the antivirus driver includes one of a file system driver and a plug-in driver of the antivirus software.

3. The method of claim 1, wherein formulating the at least one task for treatment of the detected malicious object further includes compiling the at least one task into a machine code.

4. The method of claim 1, wherein formulating the at least one task for treatment of the detected malicious object further includes writing the at least one task for treatment of the detected malicious object into a specific registry branch before rebooting the computer.

5. The method of claim 1, wherein formulating the at least one task for treatment of the detected malicious object further includes saving the at least one task for treatment of the detected malicious object into a file before rebooting the computer.

6. The method of claim 1, further comprising using system notifications to start the execution of the at least one task for treatment of detected malicious object.

7. The method of claim 1, wherein the antivirus driver is loaded by the operating system of the computer from another computer over a network.

8. A system for treatment of malicious objects on a computer, the system comprising:
  a computer hardware processor configured to execute an antivirus software, wherein the antivirus software is configured to:
    perform an antivirus scan of a first plurality of objects associated with the operating system of the computer and a second plurality of objects requiring separate corresponding drivers to access;
    detect a malicious object on the computer;

formulate at least one task for treatment of the detected malicious object;
configure and activate an antivirus driver to execute the at least one formulated task for treatment of the detected malicious object;
before rebooting the computer, check an integrity of the at least one task by using another driver;
rebooting the computer by the antivirus software;
upon detecting a modification of the at least one task by the detected malicious object, restore the at least one task by using the another driver; and
load the antivirus driver to execute the at least one task for treatment of the detected malicious object.

9. The system of claim 8, wherein the antivirus driver includes one of a file system driver and a plug-in driver of the antivirus software.

10. The system of claim 8, wherein the antivirus software is configured to formulate the at least one task for treatment of the detected malicious object by compiling the at least one task into a machine code.

11. The system of claim 8, wherein the antivirus software is configured to formulate the at least one task for treatment of the detected malicious object by writing the at least one task for treatment of the detected malicious object into a specific registry branch before rebooting the computer.

12. The system of claim 8, wherein the antivirus software is configured to formulate the at least one task for treatment of the detected malicious object by saving the at least one task for treatment of the detected malicious object into a file before rebooting the computer.

13. The system of claim 8, wherein the antivirus software is further configured to use system notifications to start the execution of the at least one task for treatment of detected malicious object.

14. The system of claim 8, wherein the antivirus driver is loaded by the operating system of the computer from another computer over a network.

15. A non-transitory computer-readable storage medium computer-executable instructions for:
performing, by an antivirus software, an antivirus scan of a first plurality of objects associated with the operating system of the computer and a second plurality of objects requiring separate corresponding drivers to access;
detecting, by the antivirus software, a malicious, object on the computer;
formulating at least one task for treatment of the detected malicious object;
configuring and activating on the computer an antivirus driver of the antivirus software to execute the at least one formulated task for treatment of the detected malicious object;
before rebooting the computer, checking an integrity of the at least one task by using another driver;
rebooting the computer by the antivirus software;
upon detecting a modification of the at least one task by the detected malicious object, restoring the at least one task by using the another driver; and
loading the antivirus driver to execute the at least one task for treatment of the detected malicious object.

16. The non-transitory computer-readable storage medium of claim 15, wherein the antivirus driver includes one of a file system driver and a plug-in driver of the antivirus software.

17. The non-transitory computer-readable storage medium of claim 15, wherein formulating the at least one task for treatment of the detected malicious object further includes compiling the at least one task into a machine code.

18. The non-transitory computer-readable storage medium of claim 15, wherein the instructions for formulating the at least one task for treatment of the detected malicious object further include instructions for writing the at least one task for treatment of the detected malicious object into a specific registry branch before rebooting the computer.

19. The non-transitory computer-readable storage medium of claim 15, wherein the instructions for formulating the at least one task for treatment of the detected malicious object further include instructions for saving the at least one task for treatment of the detected malicious object into a file before rebooting the computer.

20. The non-transitory computer-readable storage medium of claim 15, further comprising instructions for using system notifications to start the execution of the task for treatment of detected malicious object.

21. The non-transitory computer-readable storage medium of claim 15, wherein the antivirus driver is loaded by the operating system of the computer from another computer over a network.

* * * * *